United States Patent [19]

Patrick et al.

[11] Patent Number: 4,844,262

[45] Date of Patent: * Jul. 4, 1989

[54] EASY ACCESS, MOISTURE RESISTANT, REUSABLE, TWO-PIECE CARTON

[75] Inventors: Harold G. Patrick, Oakwood; Robert L. Nolan, Dahlonega, both of Ga.

[73] Assignee: Allied Paper Incorporated, Dayton, Ohio

[*] Notice: The portion of the term of this patent subsequent to Jun. 28, 2005 has been disclaimed.

[21] Appl. No.: 191,618

[22] Filed: May 9, 1988

Related U.S. Application Data

[63] Continuation of Ser. No. 878,094, Jun. 24, 1986, Pat. No. 4,753,348.

[51] Int. Cl.⁴ .............................................. B65D 83/08
[52] U.S. Cl. .................................. 206/449; 206/494; 206/604; 206/620; 229/23 BT
[58] Field of Search ............... 206/449, 494, 554, 597, 206/604, 620; 229/23 BT, 122; 221/33, 45, 34, 46, 63-65, 197, 199, 281, 302, 304, 305

[56] References Cited

U.S. PATENT DOCUMENTS

| | | | |
|---|---|---|---|
| 2,170,230 | 8/1939 | Armstrong | 206/449 |
| 2,675,123 | 4/1954 | Baird | 229/23 BT |
| 2,801,000 | 7/1957 | Busch | 206/354 |
| 2,880,866 | 4/1959 | Van Dyck | 229/23 BT |
| 3,161,336 | 12/1964 | Loescher | 206/611 |
| 3,262,631 | 7/1966 | Belsinger | 229/122 |
| 3,367,487 | 2/1968 | Dwyer, Jr. | 206/449 |
| 3,416,719 | 12/1968 | Pilger | 229/52 B |
| 3,441,193 | 4/1969 | Castle | 229/122 |
| 3,616,989 | 11/1971 | Martinek et al. | 229/122 |
| 3,666,167 | 5/1972 | Watts | 229/122 |
| 3,761,012 | 9/1973 | Rosenburg, Jr. | 206/449 |
| 3,858,720 | 1/1975 | Flagler | 229/122 |
| 4,105,152 | 8/1978 | Elward | 229/23 BT |
| 4,164,313 | 8/1979 | Hewitt | 229/122 |
| 4,269,347 | 5/1981 | Cavan, Jr. | 229/919 |
| 4,371,110 | 2/1983 | Kulig | 229/122 |
| 4,413,769 | 11/1983 | Michetti | 229/122 |
| 4,565,316 | 1/1986 | Jes | 229/23 BT |
| 4,658,962 | 4/1987 | Burns et al. | 229/23 BT |

FOREIGN PATENT DOCUMENTS

| | | | |
|---|---|---|---|
| 0650209 | 10/1962 | Canada | 229/23 BT |
| 2245202 | 4/1975 | France | 221/63 |

Primary Examiner—Jimmy G. Foster
Attorney, Agent, or Firm—Tarolli, Sundheim & Covell

[57] ABSTRACT

An easy-access, moisture resistant, reusable, two-piece carton especially adapted for holding computer forms. The carton of the present invention is reusable in the sense that it is usable first for shipping of items such as one-ply cut sheet forms and subsequently is uniquely usable again for storage of the forms during the period of use and withdrawal of the forms.

4 Claims, 1 Drawing Sheet

EASY ACCESS, MOISTURE RESISTANT, REUSABLE, TWO-PIECE CARTON

This is a continuation of co-pending application Ser. No. 878,094 filed on June 24, 1986, now U.S. Pat. No. 4,753,348

The present invention relates to an easy-access, moisture resistant, reusable, two-piece carton especially adapted for holding computer forms. The carton of the present invention is reusable in the sense that it is usable first for shipping of items such as one-ply cut sheet forms and subsequently is uniquely usable again for storage of the forms during the period of use and withdrawal of the forms.

BACKGROUND OF THE PRESENT INVENTION

Two-piece cartons comprising a bottom part and a lid or top part which is placed over the bottom part, acting as a closure, are well known. These cartons are often used for such purposes as shipping and storage, and hold a variety of items, such as business forms and other such items. Generally, the cartons are rectangular in configuration having side, end, and top and bottom panels, wherein the lid side and end panels slide over and downward against the bottom part side and end panels, in a close fitting relationship with the bottom part panels. Normally the lid side and end panels are relatively short in height dimension, in contrast to the bottom part wherein these panels are relatively deep or long in height, to permit the carton to hold a large number of whatever items are contained in the carton.

Although one might consider a generally rectangular shipping carton to be an ideal mode for shipping and storing a loose pack of forms, several problems have made this particular end use for shipping and storing one-ply cut sheet forms less than practical. One is that stacked items, such as cut sheet forms, are not readily removable on a one-by-one basis from deep recesses such as a carton. Removal generally requires gripping and removing several forms or even the whole stack. Another problem is that the cartons are not resistant to moisture transmission, and the contents in the absense of special precautions, are susceptible to changes in atmospheric conditions. This is especially undesirable in the case of computer cut sheet forms because of the requirement, in the operation of computers, that humidity cnditions in the environs of the computer be closely controlled.

As a result, it has been conventional practice in the shipment and storage of computer forms to shrink wrap small sets of the forms into packs, for instance about 500 sheets each, and then place these packs in a carton. The customer, on receipt of a shipment, individually unwraps a pack, each time an old pack is exhausted, and disposes of the shrink film and chipboard used to separate the individual packs. This has the obvious undesirable features that, first, the step of unwrapping a pack is time-consuming and, second, many forms are in a loose stacked condition until use, once a pack is unwrapped.

One object of the present invention is to provide a shipping carton which can be used for a large number of forms in which wrapping individual packs of forms is unnecessary.

Another object of the present invention is to provide such a carton which can also be used for storage of the forms, i.e., one in which removal of the forms one at a time is made easily possible.

DISCLOSURE OF INVENTION

The present invention resides in an improved two-piece carton especially adapted for the shipment and storage of computer forms comprising a bottom part and a top part; each part comprising side and end panels; the bottom part further comprising bottom panel means and the top part further comprising top panel means; the bottom part side and end panels having a depth effective for containing a high stack of forms; the top part side and end panels having a similar depth effective to cover most of the surface of the bottom part side and end panels when the top part is in an overlapping closure position with regard to the bottom part; at least one of the end panels of the bottom part being connected to the bottom part side panels along lines of perforations to permit hand separation of said end panel from the side panels.

Preferably, the top part end panels are provided with cutouts centered along the lower edges of said end panels to permit the use of automatic strapping machinery in the closing of said cartons, and to facilitate removal of the top part or lid from the bottom part prior to use of the carbon contents.

BRIEF DESCRIPTION OF THE DRAWINGS

The present invention and advantages thereof will become more apparent upon consideration of the following specification with reference to the accompanying drawings, in which.

BEST MODE OF CARRYING OUT THE INVENTION AND INDUSTRIAL APPLICABILITY

Figure 1:
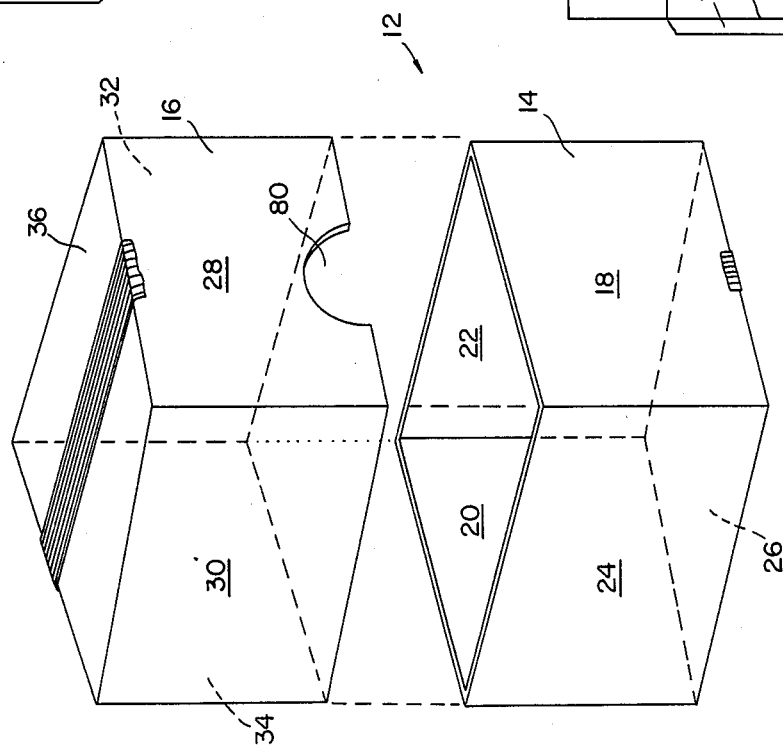
FIG. 1 is a perspective view of a carton in accordance with the concepts of the present invention.

Turning to FIG. 1, the carton of the present invention is designated broadly with the numeral 12. As shown, the carton comprises a bottom part 14 and a top part 16 or lid adapted to be placed over the bottom part. The bottom part is generally rectangular in configuration and is comprised of end panels 18 and 20 and side panels 22 and 24. The bottom part is also comprised of a bottom panel means 26, to be described, shown in dotted lines.

As shown, the height of the end and side panels of the bottom part is sufficient for the part to contain a large number of items, for instance a relatively high stack of computer forms. In actual practice, it is contemplated that the carbons will be sized to contain two stacks of computer sheets, the stacks being in side-by-side relationship, with a chip board divider between the stacks.

Similarly, the top part 16 comprises end panels 28 and 30, and side panels 32 and 34, the side panel 32 being shown in dotted lines. The top part or lid also is provided with a top panel means 36, to be described.

As shown, the dimensions for the top part are substantially the same as those for the bottom part, with the exception that the dimensions are adjusted to allow the top part panels to fit down over the outside of the panels of the bottom part. In this respect, it is an important feature of the present invention that the end and side panels of the top part have approximately the same height dimension as the height dimension of these panels of the bottom part.

Both the bottom and top parts are made out of corrugated fiberboard, for instance a single wall corrugated fiberboard that tests at 200 lbs. /sq inch.

Figure 2:
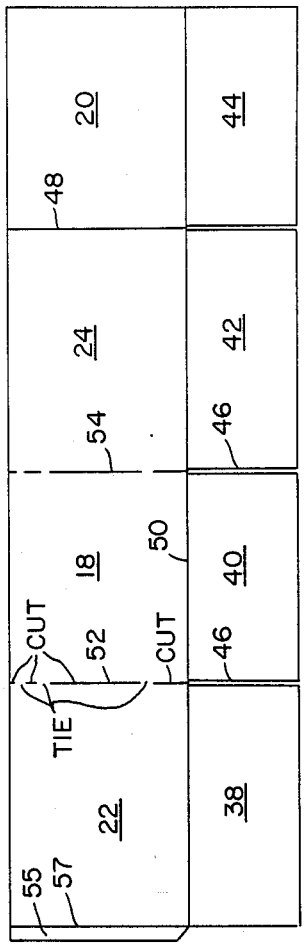
FIG. 2 is a plan view of a sheet from which the bottom part of the carton of FIG. 1 is prepared.
Figure 3:
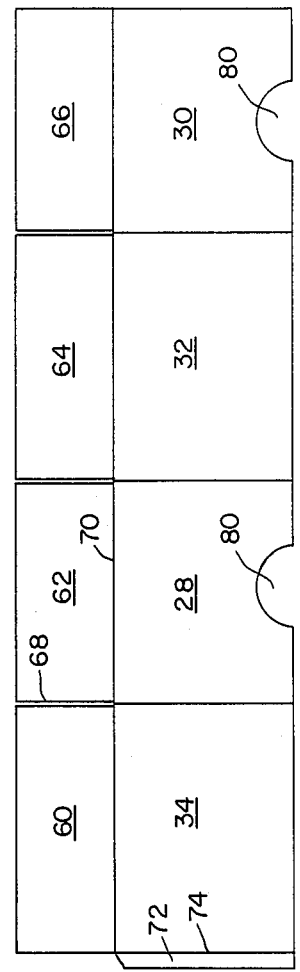
FIG. 3 is a plane view of a sheet from which the top part or lid of the carton of FIG. 1 is prepared.

Details of the flat sheets used to make the top and bottom parts are shown in FIGS. 2 and 3. For instance, referring to FIG. 2, going from left to right there is shown side panel 22, end panel 18 which can also be referred to as the front panel, second side panel 24 and end panel 20. Attached to the bottom edges of the successive panels are flaps 38, 40, 42 and 44, which make up in part the bottom panel of the bottom part. The flaps are separated from each other along cut lines 46, which are ⅜ inch wide slots.

The side and end panels are connected to each other by vertical score lines 48, which permit the panels to be folded relative to each other, and these panels are also connected to the respective flaps by horizontal score lines 50 which permit the flaps to be folded relative the side and end panels. In the Example illustrated, the sheet size is about 52 inches by 16½ inches, with each vertical score line being spaced at 13⅝ inches or 12¼ inches, alternatively, from an adjacent vertical score line.

In the Example illustrated in FIG. 2, the end panel 18 defines as mentioned the front of the carton bottom part, and the vertical score lines for this panel are provided with spaced perforations which permit a user to tear the panel from adjacent panels along the connecting lines of perforation (lines 52 and 54) to fold the panel out of the way for removal of the carton contents. In this Example, the vertical score lines 52 and 54 of the panel 18 are provided with, starting from the top, a ¾ inch cut, a ⅛ inch tie, a 1 inch cut, a second ⅛ inch tie, a 5½ inch cut, a ¼ inch tie, and finally a 2¼ inch cut.

To form the bottom part, after the sheet is cut, scored and appropriately perforated, the end and side panels are folded onto each other in a conventional fashion while at the same time folding up the flaps 38, 40, 42 and 44 to make up the bottom of the carton bottom part. At this point, the panels 22 and 20 are glued together by means of glue tab 55 connected to panel 22 along fold line 57. Subsequently, a corrugated filler pad (not shown) is placed into the bottom of the bottom part, against the overlaping bottom flaps, and is glued into place to hold the carton together when the end flap 18 is separated from the rest of the panels along the lines of perforation described above. The filler pad has approximately the same inside dimensions as the bottom part, taken in a horizontal cross-section view.

Details of the top part or lid for the carton are shown in FIG. 3. As with the bottom part, the lid is formed from a sheet which in this Example is about 53½ inches by 16¾ inches in dimension and scored along vertical score lines spaced alternatively at 12½ inches and 14 inches apart from each other. The 12½ horizontal dimensions define the end panels 28 and 30 and the 14 inch dimensions define the side panels 34 and 32. Also, each of these panels is provided with a flap (items 60, 62, 64 and 66) wherein the flaps are separated from each other by ⅜ inch slots 68 with the flaps being connected to the respective panels by means of score lines 70. The score and cut lines permit the various panels and flaps to be folded into the configuration shown in FIG. 1 with one of the end panels being connectable to one of the side panels along a joint tab 72. The joint tab is foldable over into a plane vertical to the plane of the drawing by means of a score line 74 between the tab and panel. Subsequent to folding the sheet into the configuration illustrated in FIG. 1, and gluing the carton along glue tab 72, the flaps 60–66 are taped together with suitable taping across the top in the manner shown in FIG. 1.

An important feature of the present invention is providing each end panel with a cutout (80) centered along the panel lower edge. By way of example, the top of the cutout is about 2⅛ inches from the panel lower edge. The purpose of these cutouts is twofold, first to facilitate raising the lid off of the bottom part and, second, to provide clearance and bottom part access for the application of tape to the bottom part of the carton as shown in FIG. 1.

In operation, the bottom part is placed on a filling table once it has been folded and optionally taped, and the filler pad has been glued in place. Two stacks of cut sheet paper or forms are placed in the carton bottom part, kept separated by a 0.020 gauge chipboard. The two stacks are sufficiently high that they extend to ½ inch above the top of the bottom part. This ½ inch of material is used to form a stop for the lid when it is placed over and slid down over the bottom part.

After the lid is in place the carton is taped as shown and then strapped with two straps to hold the lid down. These strips extend around the girth of the box and are applied in a strapping machine. They are applied with sufficient tension to exert a compressive force of the lid on the paper stacks of about 150 lbs./sq/inch.

A key feature of the carton of the present invention is to keep moisture from the atmosphere or storage conditions from penetrating into the carton contents. This is in part accomplished by the double-wall carton thickness provided by the end and side panels, for the carton top part or lid, which are of essentially the same height as the same panels of the carton bottom part and thus almost fully overlap the bottom panels. In addition, the compressive force of the strapping causes the stacks of cut sheet paper or forms to substantially fill the carbon leaving few air spaces or voids for the flow of moisture into the carton.

The carton after being strapped is placed on a pallet covered by a layer of 7 mil stretch film. By way of example, 36 cartons can be stacked on a pallet. The fully stacked pallet is then covered with the stretch film on the top and and sides. The packed and wrapped pallet is delivered to the customer's computer room which is humidity controlled before being unwrapped. This further keeps moisture from penetrating the paper within the carton.

Above, it was mentioned that conventional practice involved shrink wrapping small sets of forms into individual packs. A typical pack may contain 500 sheets. By comparison, in the present invention, a carton can contain as many as two stacks of the same sheets, each stack consisting of 2250 sheets. At the same time, removability of the front panel of the bottom part from its position permits the sheets to be withdrawn readily, one or a few at a time, without disturbing the stacked condition of the reset of the sheets.

We claim:

1. A two-piece carton containing a stack of one-ply cut sheets especially adapted for shipment, storage and dispensing of such cut sheets comprising:
    a bottom part comprising four side panels and a bottom panel defining a rectangular carton bottom piece configuration open only at the top adapted to contain said stack of one-ply cut sheets;

a pair of generally straight perforation lines extending from said top down connecting one of said side panels in the bottom part, said perforation lines being dimensioned and positioned effective to permit hand separation of at least a substantial portion of said one side panel from the configuration of said bottom part to expose said stack of one-ply cut sheets and to provide access through a side of said bottom part to allow removal of said one-ply cut sheets through said access;

a top part comprising four side panels and a top panel defining a rectangular carton top piece configuration open only at the bottom, the top part side panels having an orientation, height dimension, and substantially the same peripheral dimensions as the bottom part, effective to cover at least most of the surface of the bottom part side panels and said lines of perforations when the top part is in an overlapping telescoping closure relationship with the bottom part;

said coverage of the bottom part side panels by the top part side panels also being effective to resist moisture ingress into said carton.

2. A two-piece carton according to claim 1, wherein said sheets are computer forms.

3. A two-piece carton according to claim 2, wherein said lines of perforations comprise alternate cut and tie areas.

4. A two-piece carton according to claim 1, wherein said lines of perforations comprise alternate cut and tie areas.

* * * * *